US012578138B2

(12) United States Patent
Dong et al.

(10) Patent No.: US 12,578,138 B2
(45) Date of Patent: Mar. 17, 2026

(54) REFRIGERATOR

(71) Applicant: LG ELECTRONICS INC., Seoul (KR)

(72) Inventors: Yongwon Dong, Seoul (KR); Younseok Lee, Seoul (KR); Sanggyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 18/267,386

(22) PCT Filed: Dec. 9, 2021

(86) PCT No.: PCT/KR2021/018649
§ 371 (c)(1),
(2) Date: Jun. 14, 2023

(87) PCT Pub. No.: WO2022/131679
PCT Pub. Date: Jun. 23, 2022

(65) Prior Publication Data

US 2024/0035730 A1 Feb. 1, 2024

(30) Foreign Application Priority Data

Dec. 15, 2020 (KR) ........................ 10-2020-0175403

(51) Int. Cl.
*F25D 23/02* (2006.01)
*E05D 7/081* (2006.01)
*E05D 11/00* (2006.01)

(52) U.S. Cl.
CPC ........... *F25D 23/025* (2013.01); *E05D 7/081* (2013.01); *E05D 11/0054* (2013.01); (Continued)

(58) Field of Classification Search
CPC ............. F25D 23/025; F25D 2323/024; F25D 2400/40; F25D 23/028; F25D 2400/36; (Continued)

(56) References Cited

U.S. PATENT DOCUMENTS 8,388,078 B2 3/2013 Kwon et al.
2010/0307188 A1* 12/2010 Kwon .................. F25D 23/028 62/449

(Continued)

FOREIGN PATENT DOCUMENTS

CN 102252484 A * 11/2011
CN 102252491 A * 11/2011

(Continued)

OTHER PUBLICATIONS

International Search Report dated Mar. 23, 2022 issued in Application No. PCT/KR2021/018649.

(Continued)

*Primary Examiner* — Hiwot E Tefera
(74) *Attorney, Agent, or Firm* — KED & ASSOCIATES, LLP

(57) ABSTRACT

A refrigerator according to the embodiment comprises: a cabinet having a storage space; a main door for opening and closing the storage space; a sub door capable of rotating relative to the main door; a hinge mechanism, which provides the rotation center of the main door and the rotation center of the sub door and in which the rotation center of the main door is positioned on the sub door; and a wire guide which guides, toward the sub door, a wire electrically connected to a component of the main door, the wire guide having an inlet, through which the wire drawn out from the main door enters, and an outlet, through which the wire is drawn out.

19 Claims, 14 Drawing Sheets

(52) U.S. Cl.
CPC ..... *E05D 11/0081* (2013.01); *E05Y 2600/626* (2013.01); *E05Y 2900/31* (2013.01); *F25D 2323/024* (2013.01); *F25D 2400/40* (2013.01)

(58) Field of Classification Search
CPC ........... E05Y 2900/31; E05Y 2600/626; E05Y 2900/302; E05Y 2400/654; E05D 7/081; E05D 11/0054; E05D 11/0081
See application file for complete search history.

(56) References Cited

U.S. PATENT DOCUMENTS

| | | | | |
|---|---|---|---|---|
| 2011/0023528 | A1* | 2/2011 | Kwon | F25D 23/028 62/449 |
| 2012/0286639 | A1* | 11/2012 | Lee | F25D 23/00 312/405.1 |
| 2014/0132144 | A1 | 5/2014 | Kim et al. | |
| 2018/0031302 | A1* | 2/2018 | Park | F25D 23/028 |
| 2018/0149420 | A1* | 5/2018 | Lee | H05K 7/1427 |
| 2018/0202706 | A1* | 7/2018 | Lee | F25D 29/005 |
| 2018/0310726 | A1* | 11/2018 | Oh | F25D 23/028 |
| 2019/0024962 | A1* | 1/2019 | Lee | E05D 11/00 |
| 2019/0257571 | A1* | 8/2019 | Park | E06B 3/70 |
| 2021/0396455 | A1* | 12/2021 | Jang | E05D 7/081 |
| 2022/0003028 | A1* | 1/2022 | Chen | F25D 23/025 |

FOREIGN PATENT DOCUMENTS

| | | | |
|---|---|---|---|
| CN | 110874882 | 3/2020 | |
| EP | 3396282 | 10/2018 | |
| JP | S63-142682 | 9/1988 | |
| JP | 2004-211977 | 7/2004 | |
| KR | 20-1999-0011033 | 3/1999 | |
| KR | 20-2000-0007478 | 4/2000 | |
| KR | 10-2006-0062664 | 6/2006 | |
| KR | 10-2014-0060430 | 5/2014 | |
| KR | 10-2016-0023741 | 3/2016 | |
| KR | 10-2018-0024352 | 3/2018 | |
| KR | 10-2018-0080032 | 7/2018 | |
| KR | 10-2018-0080092 | 7/2018 | |
| KR | 10-2018-0120005 | 11/2018 | |
| WO | WO 01/71264 | 9/2001 | |
| WO | WO-2004029528 A1 * | 4/2004 | F25D 23/02 |
| WO | WO 2010/010093 | 1/2010 | |
| WO | WO 2020/043138 | 3/2020 | |

OTHER PUBLICATIONS

International Search Report dated Mar. 17, 2022 issued in Application No. PCT/KR2021/018643.
International Search Report dated Mar. 17, 2022 issued in Application No. PCT/KR2021/018646.
U.S. Appl. No. 18/267,341, filed Jun. 14, 2023.
U.S. Appl. No. 18/267,369, filed Jun. 14, 2023.
U.S. Office Action dated Sep. 23, 2024 issued in U.S. Appl. No. 18/267,341.
Extended European Search Report dated Sep. 17, 2024 issued in Application No. 21906982.0.
Extended European Search Report dated Sep. 17, 2024 issued in Application No. 21906981.2.
Extended European Search Report dated Sep. 17, 2024 issued in Application No. 21906983.8.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2021/018649, filed Dec. 9, 2021, which claims priority to Korean Patent Application No. 10-2020-0175403, filed Dec. 15, 2020, whose entire disclosures are hereby incorporated by reference.

TECHNICAL FIELD

The present embodiment relates to a refrigerator.

BACKGROUND ART

In general, a refrigerator is a home appliance that stores food at a low temperature in a storage space of an interior shielded by a refrigerator door, and the refrigerator is configured to keep the stored food in an optimal condition by cooling the inside of the storage space using cold air generated through heat exchange with a refrigerant circulating in the refrigeration cycle.

The refrigerator may be independently placed in a kitchen, a living room, or the like, or may be stored in a furniture closet of a kitchen.

Refrigerators are gradually becoming larger and more multi-functional in accordance with changes in eating habits and the trend of high quality products, and refrigerators equipped with various structures and convenient devices considering user convenience are being released.

In Korean Patent Publication No. 10-2018-0024352, which is a prior document, a refrigerator is disclosed.

The refrigerator includes a cabinet forming a storage space and a door opening and closing the storage space. The door includes a main door and a sub door.

The main door is pivotally mounted to the cabinet by an upper hinge and a lower hinge. The sub door is provided with a sub upper hinge and a sub lower hinge and is rotatably mounted on the front surface of the main door.

Electric wires inside the sub door are guided to the outside through the electric wire hole on the upper rear surface of the sub door, and electric wires inside the main door are guided to the outside through the hinge hole of the upper hinge.

In the case of these prior documents, the hinge shafts of the main door and the sub door are provided separately from each other and are spaced apart in a horizontal direction, and the hinge shaft of the main door is located closer to the cabinet than the hinge shaft of the sub door. Accordingly, there is a disadvantage in that the sub door interferes with the furniture closet in the process of opening the main door in a state in which the refrigerator of the prior document is located inside the furniture closet.

DISCLOSURE

Technical Problem

The present embodiment provides a refrigerator in which twisting of electric wires is minimized during opening of the door without the electric wires passing through a hinge shaft of the door.

Optionally or additionally, the present embodiment provides a refrigerator in which the opening angle of a door can be increased even when the refrigerator is located in a furniture closet.

Technical Solution

A refrigerator according to an aspect may include a cabinet having a storage space; a main door configured to open and close the storage space; a sub door relatively rotatable with respect to the main door; a hinge mechanism providing a rotation center of the main door and a rotation center of the sub; and a wire guide that guides a wire electrically connected to a component of the main door toward the sub door.

The rotation center of the main door may be located on the sub door.

The wire guide may include an inlet through which the wire drawn out from the main door is drawn into and an outlet through which the wire is drawn out.

The rotation center of the main door may pass through the outlet of the wire guide.

The main door may include a guide coupling portion to which the wire guide is coupled. In a state in which the wire guide is coupled to the guide coupling portion, a portion of the wire guide may protrude forward of the main door.

The sub door may be provided with a guide accommodation portion in which a portion of the wire guide is located.

An opening through which the wire inside the main door passes through may be provided on one side wall of the guide coupling portion.

The outlet of the wire guide may be located in the guide accommodation portion of the sub door.

The wire guide may include a guide body including the inlet and the outlet. The wire guide may further include a first extension wall and a second extension wall extending in a horizontal direction from the inlet side of the guide body and spaced apart in a vertical direction.

The first extension wall and the second extension wall may be coupled to the guide coupling portion. The guide body may be located outside the main door.

The first extension wall and the second extension wall may be slidably coupled to the guide coupling portion. A coupling rib may be provided on one side wall of the guide coupling portion, and the first extension wall may be provided with a coupling slit accommodating the coupling rib.

A fastening hole into which a fastening member is fastened may be provided at one side wall of the guide coupling portion, and a fastening boss to which the fastening member penetrating through the fastening hole is fastened may be provided on the second extension wall.

The hinge mechanism may include a hinge bracket fixed to the cabinet; and a hinge pin fixed to the hinge bracket and providing a rotation center of the main door.

The guide body may be located above the hinge pin and the outlet may be provided on a lower wall of the guide body.

The refrigerator may further include a bracket cover covering a portion of the hinge bracket and guiding the wire passing through the outlet of the wire guide toward the cabinet between the guide body and the hinge bracket. The bracket cover may include a wire passage aligned with the outlet and the hinge pin in the vertical direction.

Alternatively, the refrigerator may further include a bracket cover covering a portion of the hinge mechanism and guiding the wire passing through the outlet of the wire guide toward the cabinet.

The bracket cover may be located below the wire guide and may include a wire passage vertically aligned with the outlet.

The bracket cover may surround at least a portion of the hinge bracket to which the hinge pin is coupled.

The refrigerator may further include a cabinet cover fixed to an upper surface of the cabinet and covering a portion of the hinge bracket. The bracket cover may be coupled to the cabinet cover.

The wire passage may be located in the guide accommodation portion of the sub door.

The rotation center of the main door may coincide with the rotation center of the sub door.

A refrigerator according to another aspect may include a cabinet having a storage space; a main door opening and closing the storage space; a sub door relatively rotatable with respect to the main door; a hinge mechanism providing a rotation center of the main door and a rotation center of the sub door; a wire guide coupled to the main door and guiding a wire electrically connected to a component of the main door toward the sub door; and a bracket cover coupled to the hinge mechanism and configured to guide a wire passing through the wire guide toward the cabinet.

The wire guide may include an inlet through which the wire is drawn into and an outlet through which the wire is drawn out. The bracket cover may include a wire passage aligned with the outlet in the vertical direction.

The rotation center of the main door may pass through the outlet and the wire passage. The rotation center of the sub door may pass through the outlet and the wire passage. A rotation center of the main door and a rotation center of the sub door may coincide with each other.

Advantageous Effect

According to the present embodiment, the twisting of the electric wire can be minimized during the opening process of the door without the electric wire passing through the hinge shaft of the door.

According to the present embodiment, since the rotation center of the main door is located at the sub door, the opening angle of the door can be increased even when the refrigerator is located inside the furniture closet.

BEST MODE

Figure 1:
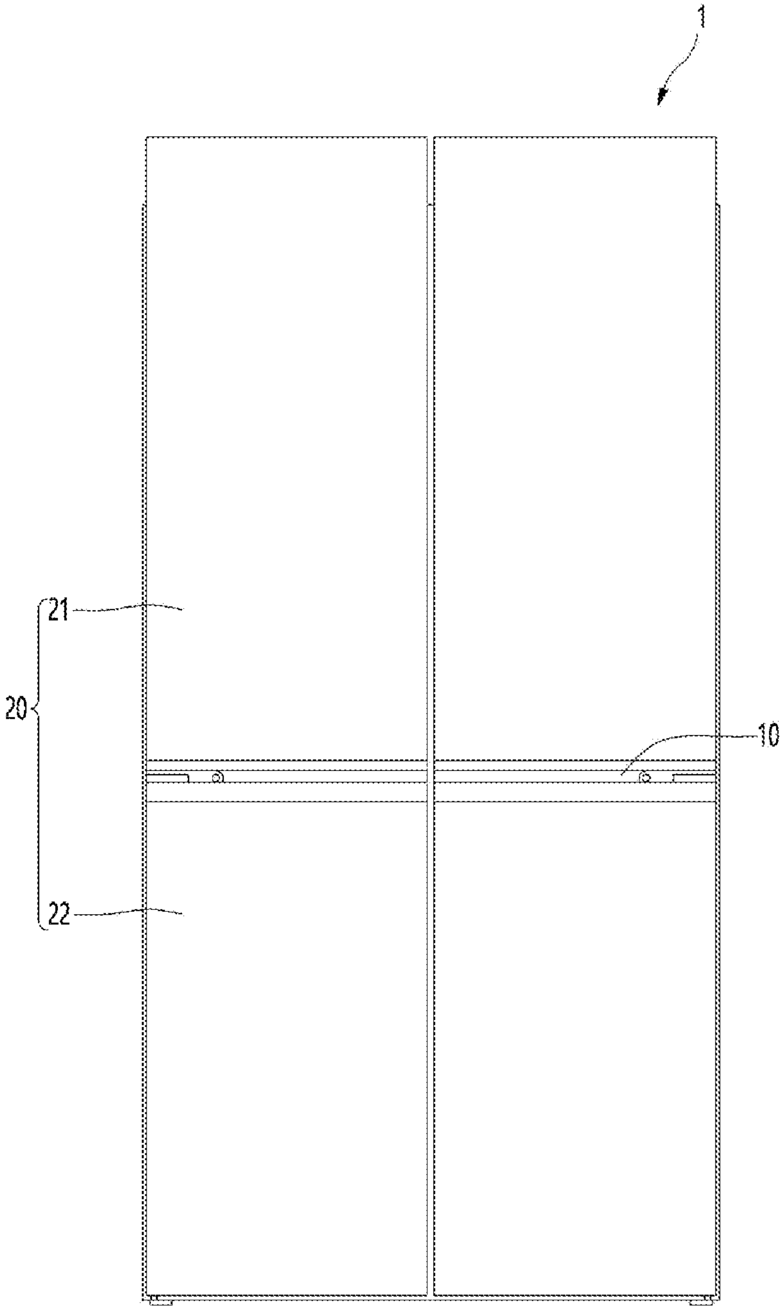
FIG. 1 is a front view illustrating a refrigerator according to the present embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is “connected”, “coupled” or “joined” to another component, the former may be directly connected or jointed to the latter or may be “connected”, coupled” or “joined” to the latter with a third component interposed therebetween.

Figure 2:
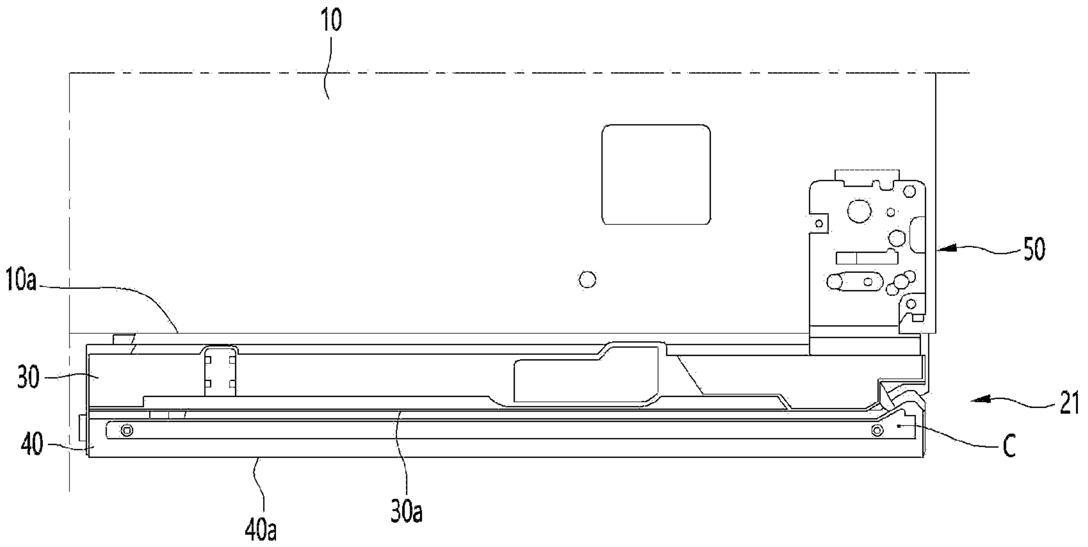
FIG. 2 is a plan view illustrating a portion of the refrigerator according to the present embodiment.
Figure 3:
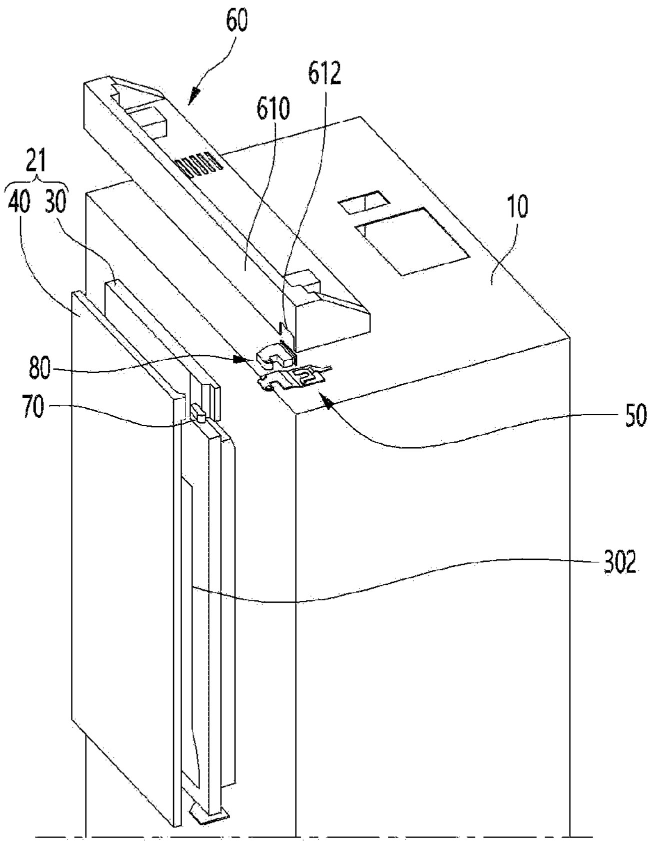
FIG. 3 is a view illustrating a state where one door of the present embodiment is separated.
Figure 4:
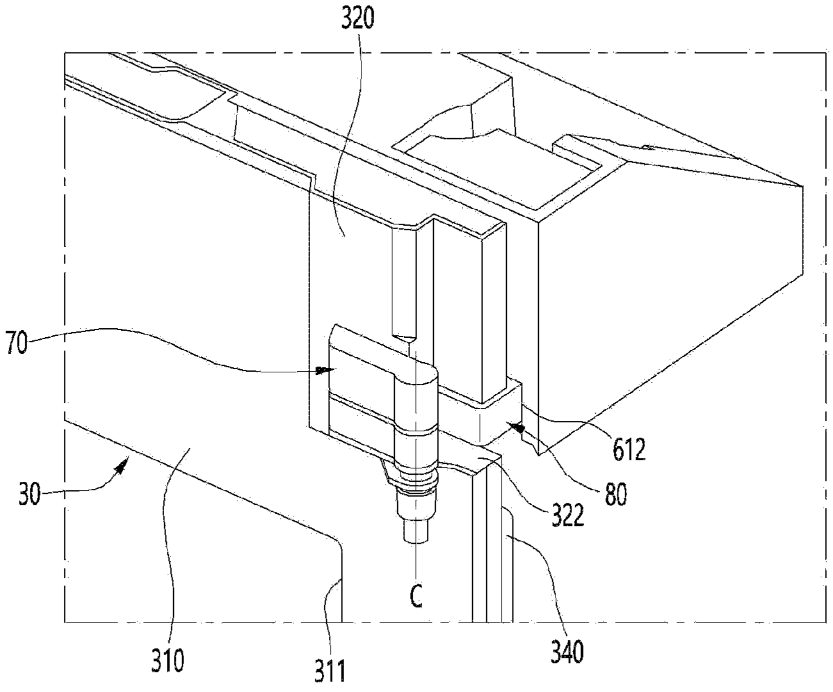
FIG. 4 is a view illustrating a wire guide and a cabinet cover of the present embodiment.
Figure 5:
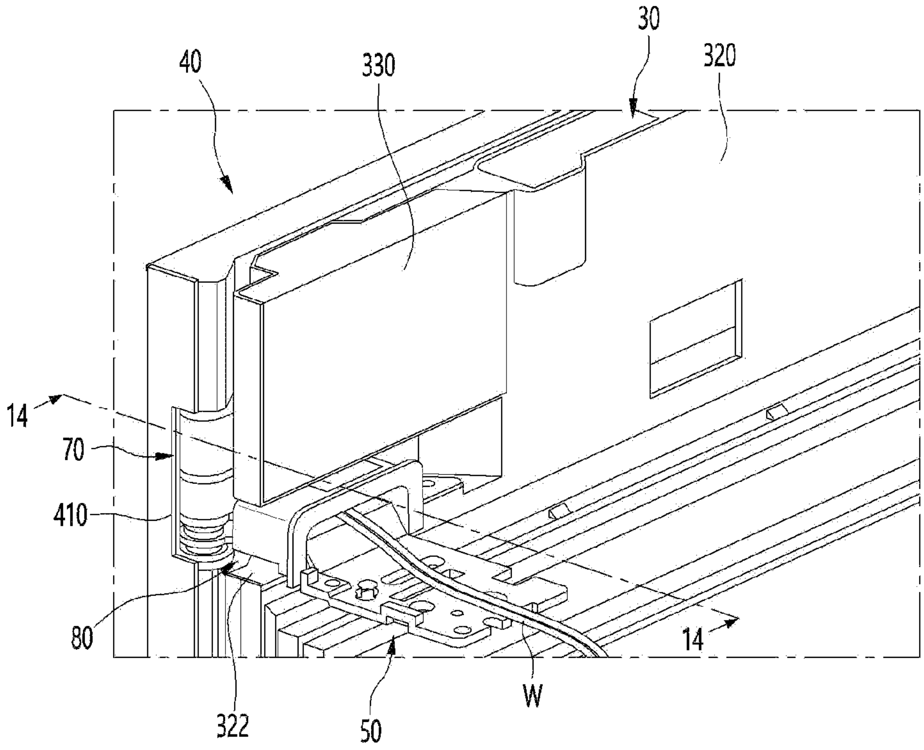
FIG. 5 is a view illustrating a state where wires are guided toward a cabinet by a bracket cover.

FIG. 1 is a front view illustrating a refrigerator according to the present embodiment, FIG. 2 is a plan view illustrating a portion of the refrigerator according to the present embodiment, FIG. 3 is a view illustrating a state where one door of the present embodiment is separated, FIG. 4 is a view illustrating a wire guide and a cabinet cover of the present embodiment, and FIG. 5 is a view illustrating a state where wires are guided toward a cabinet by a bracket cover.

Referring to FIGS. 1 to 5, the refrigerator 1 according to the present embodiment may be installed independently in a kitchen or installed in a state of being accommodated in an indoor furniture closet. When the refrigerator 1 is installed in the indoor furniture closet, the refrigerator 1 may be installed alone or arranged side by side with other refrigerators.

The refrigerator 1 may include a cabinet 10 having a storage space and a refrigerator door 20 opening and closing the storage space.

The storage space is not limited, but may be divided into an upper first space and a lower second space, and the refrigerator door 20 also may include a first door 21 opening and closing the first space and the second door 22 opening and closing the second space.

The first space may be a refrigerating chamber, and the second space may be a freezing chamber or vice versa. Alternatively, it is also possible that the storage space includes a first space and a second space divided into left and right sides. Alternatively, the storage space may be a single space, and a single refrigerator door may open and close the storage space.

At least one of the first door 21 and the second door 22 may be a rotation type door. Alternatively, the single refrigerator door 20 may be a rotation type door.

In the present embodiment, a state where the two first doors 21 are disposed in the left and right direction will be described as an example. In addition, in the present embodiment, a state where the first door on the right side including the main door and the sub door 40 will be described as an example. Of course, it is also possible that the first door 21 on the left side includes the main door 30 and the sub door 40.

Hereinafter, the first door including the main door 30 and the sub door 40 will be referred to as "door 21" for convenience of description.

The main door 30 is rotatably connected to the cabinet 10 by a hinge mechanism 50 and can open and close the storage space.

The main door 30 may include an opening 302.

The sub door 40 may open and close the opening 302 of the main door For example, the sub door 40 may open the opening 302 while the main door 30 is closed. Alternatively, the main door 30 may be opened together with the sub door 40 in a state in which the opening 302 of the main door 30 is closed by the sub door 40.

The sub door 40 may open and close the opening 302 in front of the main door 30. In other words, as illustrated in FIG. 2, the front surface 40*a* of the sub door 40 may be located in front of the front surface 30*a* of the main door 30. The distance between the front surface 40*a* of the sub door 40 and the front surface 10*a* of the cabinet 10 may be longer than the distance between the front surface 30*a* of the main door 30 and the front surface 10*a* of the cabinet 10.

The sub door 40 may be connected to the hinge mechanism 50. The sub door 40 can rotate with respect to the cabinet 10 and the main door 30 by the hinge mechanism 50.

The hinge mechanism 50 may provide a rotation center C of the main door as well as a rotation center of the sub door 40.

The center of rotation C of the main door 30 may coincide with the rotation center of the sub door 30. In other words, the main door 30 and the sub door 30 may have the same rotation center.

The rotation center C may be located in the sub door 40. For example, the rotation center C may extend from the sub door 30 in the vertical direction.

A distance between the rotation center C and the front surface 10*a* of the cabinet 10 may be greater than a distance between the front surface 30*a* of the main door and the front surface 10*a* of the cabinet 10.

The refrigerator 1 may further include a wire guide 70 for guiding a wire (see W in FIG. 5) electrically connected to a component inside the main door 30. The wire guide 70 may guide the wire W connected to the main door 30 toward the rotation center C.

The wire guide 70 may be coupled to the main door 30. A portion of the wire guide 70 may protrude from the main door 30 while the wire guide 70 is coupled to the main door 30.

The main door 30 may include a portion or all of a front frame 310 including an opening 311, a door frame 320 coupled to the front frame 310, and a door liner 340 coupled to the front frame 310.

The door frame 320 may include an upper frame and a lower frame. The door frame 320 may further include a side frame.

The upper frame, the lower frame, and the side frames may be formed integrally or separately.

One side of the door liner 340 may be directly connected to the front frame 310, and the other side of the door liner 340 may be connected to the front frame 310 through a side frame 330.

The door frame 320 may further include a slot 322 in which the hinge mechanism 50 is located. The hinge mechanism 50 may pass through the slot 322 and extend toward the sub door 40.

The wire guide 70 may be coupled to the door frame 320. A portion of the wire guide 70 may protrude from the door frame 320 in a state in which the wire guide 70 is coupled to the door frame 320.

When the rotation center C is located at the sub door 30, since the wire W drawn out from the main door 30 should be guided toward the rotation center C located at the sub door 30, the protruding portion of the main door 30 may be accommodated in the sub door 40.

The refrigerator 1 may further include a bracket cover 80 covering at least a portion of the hinge mechanism 50. The bracket cover 80 may guide the wire W guided by the wire guide 70 toward the cabinet 10 in a state of covering the hinge mechanism 50. Of course, the bracket cover 80 may be omitted.

The sub door 40 may include a guide accommodation portion 410. The guide accommodation portion 410 may be formed as the rear surface of the sub door 40 is recessed forward.

Although not limited, the rotation center C may extend within the guide accommodation portion 410 in the vertical direction.

The wire guide 70 may be accommodated in the guide accommodation portion 410.

The refrigerator 1 may further include a cabinet cover 60 fixed to an upper surface of the cabinet 10.

The bracket cover 80 may be coupled to the cabinet cover 60. For example, the bracket cover 80 may be coupled to the front wall 610 of the cabinet cover 60. A front wall 610 of the cabinet cover 60 may include a coupling slot 612 to which the bracket cover 80 is coupled.

Accordingly, the wire W guided by the cabinet cover 60 extends into the inner space of the cabinet cover 60 and may be connected to a controller (not illustrated). Of course, the cabinet cover 60 may be omitted.

A portion of the bracket cover 80 coupled to the cabinet cover 60 may protrude toward the front of the cabinet cover 60.

The forwardly protruding portion of the cabinet cover 60 from the bracket cover 80 passes through the slot 322 of the main door 30 and may be accommodated in the guide accommodation portion 410 of the sub door 40.

The wire guide 70 and the bracket cover 80 may be arranged in a vertical direction. For example, the bracket cover 80 may be located below the wire guide 70.

The rotation center C may pass through the wire guide 70 and the bracket cover 80.

According to the present embodiment, when the sub door 40 is opened, since the wire guide 70 and the bracket cover 80 are exposed to the outside, external exposure of the hinge mechanism 50 and the wire W may be prevented.

Figure 6:
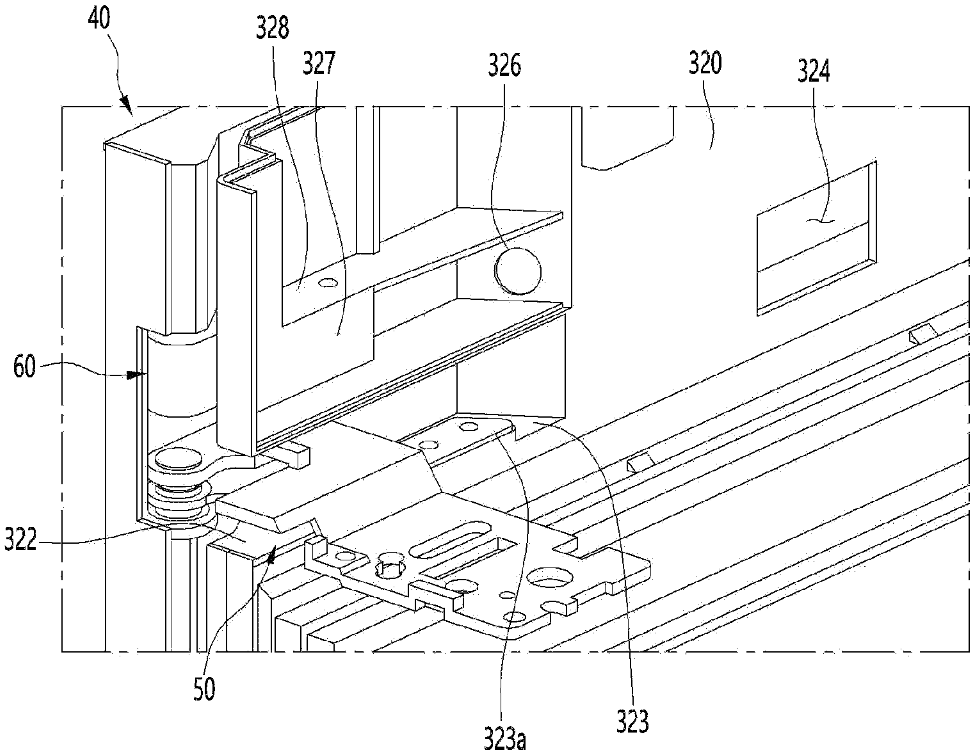
FIG. 6 is a view illustrating a space for guiding wires in the main door.
Figure 7:
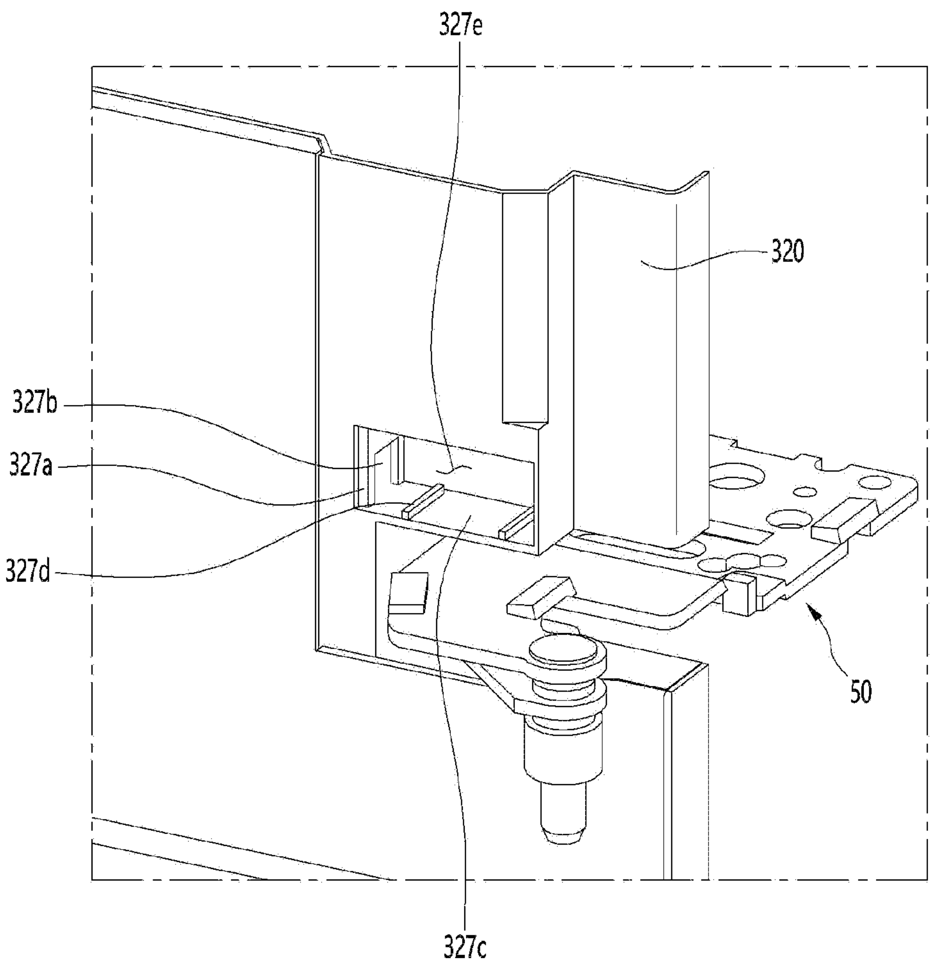
FIG. 7 is a view illustrating the wire coupling portion of the main door from the front side of the main door.
Figure 8:
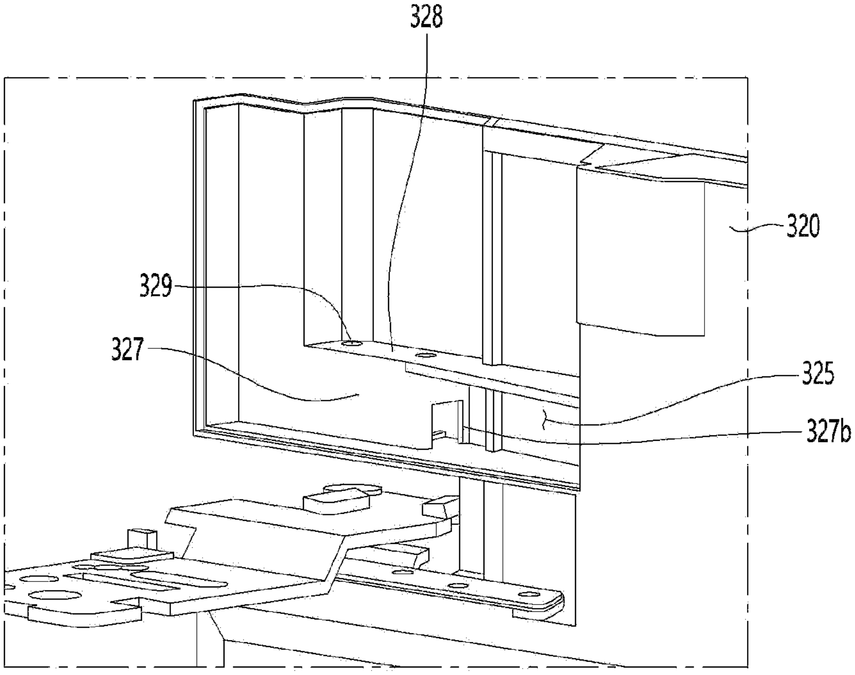
FIG. 8 is a view illustrating the wire coupling portion of the main door from the rear side of the main door.

FIG. 6 is a view illustrating a space for guiding wires in the main door, FIG. 7 is a view illustrating the wire coupling portion of the main door from the front side of the main door, and FIG. 8 is a view illustrating the wire coupling portion of the main door from the rear side of the main door.

Referring to FIGS. 5 to 8, a space 324 in which a component connected to the wire W can be accommodated may be formed inside the door frame 320. The door frame 320 may include a first opening 326 through which the wire W is drawn from the inside of the door frame 320.

A wire accommodation space 325 for positioning the wire W drawn out through the first opening 326 may be formed on the rear surface of the door frame 320. The wire accommodation space 325 may be covered by a cover member 330.

The door frame 320 may further include a guide coupling portion 327 to which the wire guide 70 is coupled.

The guide coupling portion 327 may include a guide accommodation space 327*e* formed as the front surface of the door frame 320 is recessed backward. The guide accommodation space 327*e* may be located above the slot 322.

A portion of the wire guide 70 may be accommodated in the guide accommodation space 327*e* at the front of the door frame 320.

The guide coupling portion 327 may include an upper wall 328, a lower wall 327*c*, and a side wall 327*a*.

A second opening 327*b* through which the wire W passes may be provided in the side wall 327*a*. Accordingly, the wire W passing through the second opening 327*b* may be guided into the wire guide 70 in the guide accommodation space 327*e*.

One or more coupling ribs 327*d* for coupling with the wire guide 70 may be provided on the lower wall 327*c*.

The coupling rib 327*d* may protrude upward from the lower wall 327*c*. The coupling rib 327*d* may extend in the front and rear direction. Therefore, the wire guide 70 may be coupled with the coupling rib 327*b* in the front and rear direction (or in the extension direction of the coupling rib 327*b*). In FIG. 8, for example, it is illustrated that a plurality of coupling ribs 327*d* are disposed to be spaced apart in the horizontal direction (for example, in the left and right direction).

One or more fastening holes 329 may be provided in the upper wall 328. In a state in which the wire guide 70 is accommodated in the guide accommodation space 327*e*, a fastening member may pass through the fastening hole 329 and be fastened to the wire guide 70. FIG. 8 illustrates that a plurality of fastening holes 329 are spaced apart in a horizontal direction.

Figure 9:
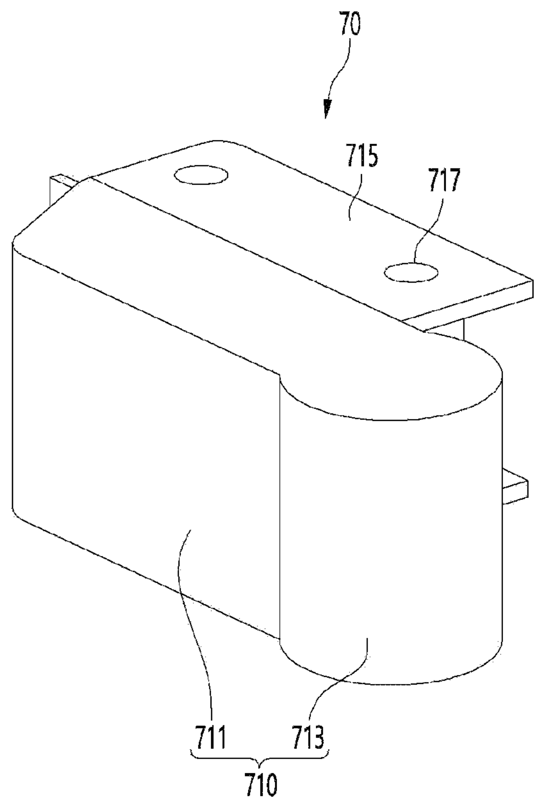
FIGS. 9 to 11 are perspective views illustrating the wire guide of the present embodiment.
Figure 10:
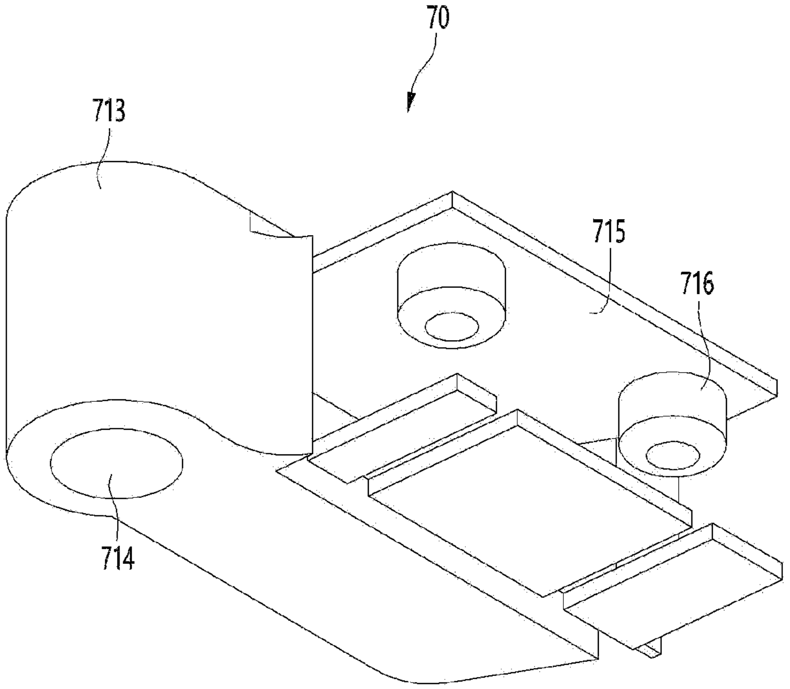
Figure 11:
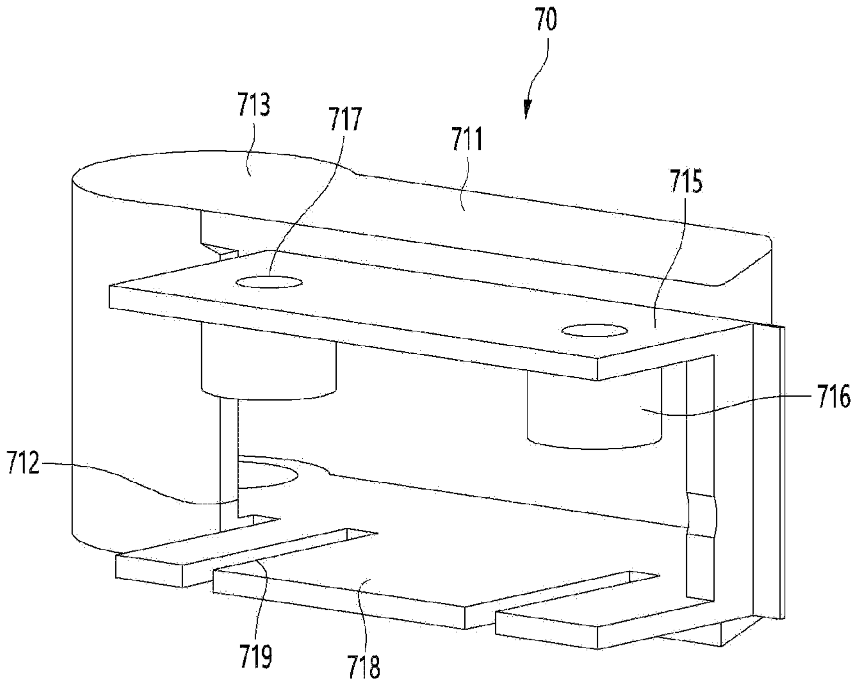

FIGS. 9 to 11 are perspective views illustrating the wire guide of the present embodiment.

Referring to FIGS. 9 to 11, the wire guide 70 may include a guide body 710.

The guide body 710 may accommodate the wire W.

The guide body 710 may include a first body 711 and a second body 713 extending from the first body 711.

The first body 711 may include an inlet 712 (or a first slot). The second body 713 may include an outlet 714 (or a second slot). In other words, the wire W may extend into the guide body 710 through the inlet 712 and be drawn out of the guide body 710 through the outlet 714. The second body 713 may include a round surface which is rounded in a horizontal direction.

The outlet 714 may be formed on a lower wall of the guide body 711. For example, the outlet 714 may be formed on a lower wall of the second body 713. The rotation center C may pass through the outlet 714.

The wire guide 70 may further include a first extension wall 715 and a second extension wall 718 extending horizontally from the guide body 710 and spaced apart from each other in a vertical direction.

The second extension wall 718 is located below the first extension wall 715.

Each of the extension walls 715 and 718 may, for example, extend from the side of the inlet 712 of the first body 711.

A fastening hole 717 aligned with the fastening hole 329 of the guide coupling portion 327 may be formed in the first extension wall 715. A fastening boss 716 aligned with the fastening hole 717 and extending downward may be provided on a lower surface of the first extension wall 715.

Accordingly, the fastening member may pass through the fastening hole 329 of the guide coupling portion 327 and the fastening hole 717 of the first extension wall 715 and be coupled to the fastening boss 716. The fastening boss 716 may be spaced apart from the second extension wall 718.

A coupling slit 719 to which the coupling rib 327*d* of the guide coupling portion 327 is coupled may be provided in the second extension wall 718.

The wire guide 70 may be slidably coupled to the guide coupling portion 327. For example, in the wire guide 70, the first extension wall 715 and the second extension wall 718 are accommodated in the guide coupling space 327*e*, and the guide body 710 is located in a protruding form in the main door 30. The coupling rib 327*d* may be inserted into the coupling slit 719 while the first extension wall 715 is accommodated in the guide coupling space 327*e*.

The wire guide 70 may guide the wire W from the outside of the main door 30.

Figure 12:
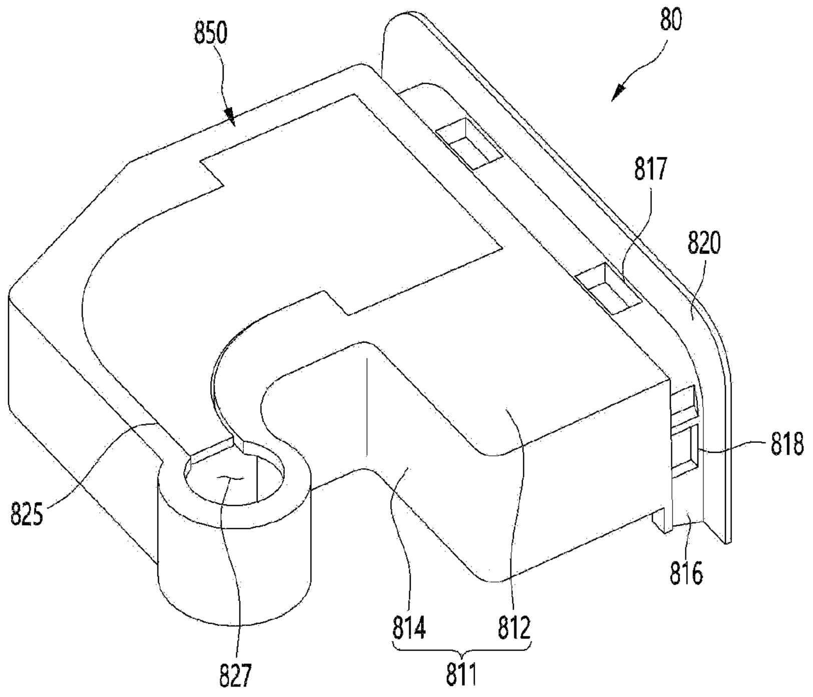
FIGS. 12 and 13 are perspective views illustrating the bracket cover of the present embodiment.
Figure 13:
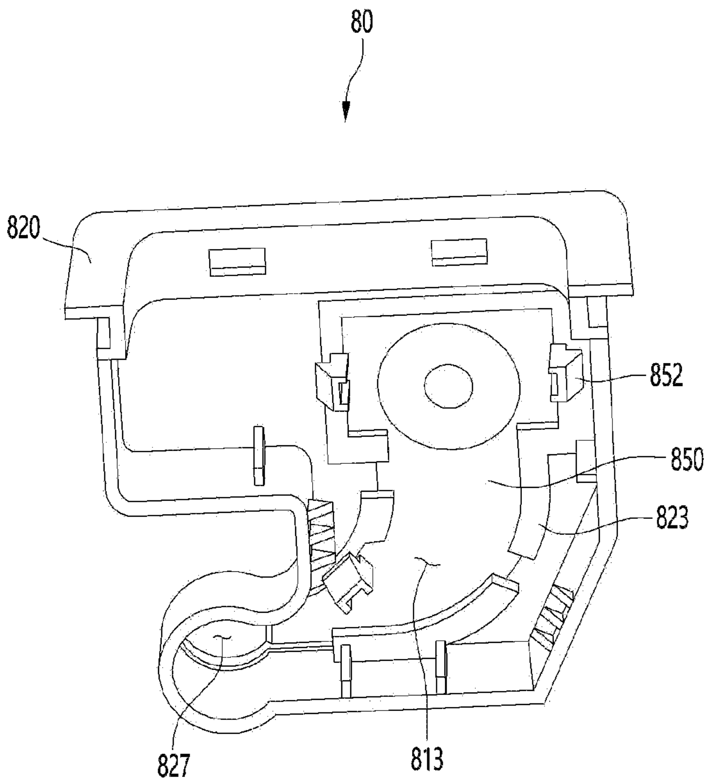

FIGS. 12 and 13 are perspective views illustrating the bracket cover of the present embodiment.

Referring to FIGS. 12 and 13, the bracket cover 80 may include a cover body 811 for covering the hinge bracket (see 510 in FIG. 14) of the hinge mechanism 50.

The cover body 811 may include an upper wall 812 and a circumferential wall 814 extending downward from the upper wall 812. A lower side of the cover body 811 may be opened.

Accordingly, the upper wall 812 and the circumferential wall 814 may form a space 813 therein, and a portion of the hinge bracket 510 may be accommodated in the space 813. Corresponding to the shape of the hinge bracket 510, a portion of the upper wall 812 may have a shape bent in the horizontal direction one or more times.

An opening 825 may be formed in the upper wall 812.

The bracket cover 80 may further include an opening cover 850 covering the opening 825.

To prevent the opening cover 850 from protruding upward while covering the opening 825, the upper wall 812 of the cover body 811 may include a seating portion 823 with a downward recessed shape.

The opening 825 may be formed in the seating portion 823. A recessed depth of the seating portion 823 may be substantially the same as a thickness of the opening cover 850.

The opening cover 850 may include a hook 852 to be coupled with the cover body 811. The hook 852 may extend downward from an edge of the opening cover 850.

After the hook 852 passes through the opening 825, the hook 852 may be caught on the lower surface of the wall forming the seating portion 823.

In a state in which the opening cover 850 is coupled to the cover body 811, a portion of the opening 825 is exposed to the outside. In other words, the opening cover 850 covers a portion of the opening 825 and does not cover the other portion thereof.

A portion of the opening 825 not covered by the opening cover 850 provides a space for the wire W to be located. Accordingly, the space in which the wire W is located may be referred to as the wire passage 827.

The wire passage 827 may be vertically aligned with the outlet 714 of the wire guide 70. Accordingly, the wire W passing through the outlet 714 of the wire guide may be drawn into the cover body 811 through the wire passage 827.

The bracket cover 80 may further include a coupling portion 816 extending from the cover body 811. The coupling portion 816 may include a top surface and both side surfaces.

An upper surface of the coupling portion 816 may be located lower than the upper side wall 812. A width between both sides of the coupling portion 816 may be smaller than a width of the bracket cover 80 in the left and right direction.

The coupling portion 816 may be formed in a shape and size corresponding to the coupling slot 612 of the cabinet cover 60.

Protrusion grooves 818 in which a protrusion (not illustrated) provided in the coupling slot 612 is accommodated may be formed on both sides of the coupling portion 816.

A protrusion hole 817 through which a protrusion (not illustrated) provided in the coupling slot 612 passes may be formed on an upper surface of the coupling portion 816.

The bracket cover 80 may further include a coupling guide 818 extending from the coupling portion 816. The coupling guide 818 is located on the opposite side of the cover body 811 based on the coupling portion 816.

A portion of the coupling guide 818 may extend in a direction away from each other on both sides from the coupling portion 816 and another portion thereof may extend upward from the coupling portion 816.

Therefore, the distance between both end portions of the coupling guide 818 is greater than the width of the coupling portion 816 in the left and right direction. In addition, the upper end of the coupling guide 818 is located higher than the upper surface 356*a* of the coupling portion 816.

A width of the coupling portion 816 in the front and rear direction may be substantially the same as a width of the coupling slot 612 of the cabinet cover 60 in the front and rear direction.

Therefore, when the bracket cover 80 is raised in a state in which the coupling portion 816 of the bracket cover 80 is aligned with the coupling slot 612, the coupling portion 816 may move upward stably in a state in which the movement within the coupling slot 612 in the front and rear direction is restricted.

The coupling guide 818 is located on the rear side of the front wall of the cabinet cover 60 in a state in which the bracket cover 80 is mounted on the cabinet cover 60.

Figure 14:
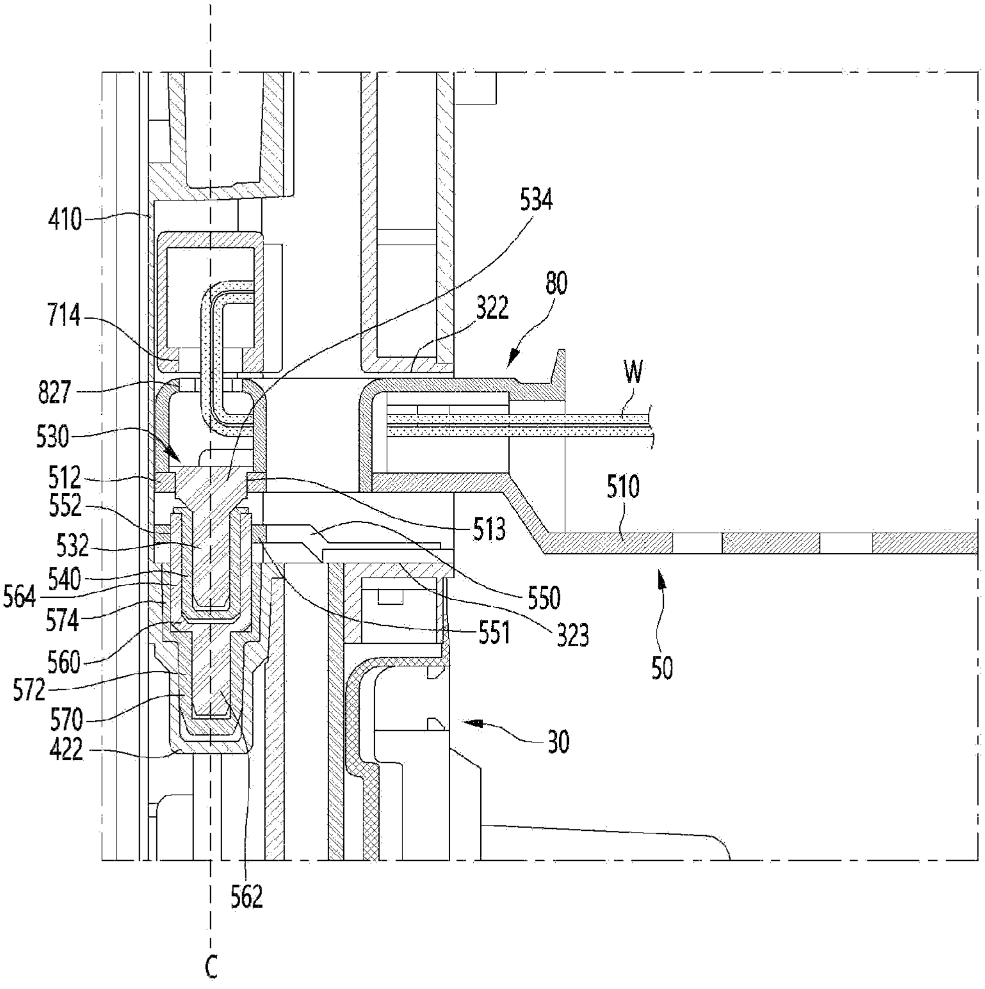
FIG. 14 is a cross-sectional view taken along line 14-14 of FIG. 5.

FIG. 14 is a cross-sectional view taken along line 14-14 of FIG. 5.

Referring to FIG. 14, the hinge mechanism 50 may include a hinge bracket 510.

The hinge bracket 510 may be fixed to an upper surface of the cabinet 10. A portion of the hinge bracket 510 may protrude toward the front of the cabinet 10 while the hinge bracket 510 is fixed to the upper surface of the cabinet 10.

A portion of the hinge bracket 510 protruding forward of the cabinet 10 can pass through the slot 322 of the main door 30 and be accommodated in the guide accommodation portion 410 of the sub door 40.

The rotation center C may pass through a portion 512 of the hinge bracket 510 located in the guide accommodation portion 410 of the sub door 40 in the vertical direction.

The hinge mechanism 50 may further include a first hinge pin 530. The first hinge pin 530 may be coupled to the hinge bracket 510. For example, a first opening 513 may be formed in the hinge bracket 510, and the first hinge pin 530 may be fitted into the first opening 513.

The first hinge pin 530 may enable rotation of the main door 30. For example, the first hinge pin 530 may provide a center of rotation of the main door 30.

The first hinge pin 530 may include a first shaft 532. The first shaft 532 may be formed in a cylindrical shape, for example.

The first hinge pin 530 may further include a coupling body 534 extending upward from the first shaft 532. A portion of the coupling body 534 may increase in diameter from the upper end portion of the first shaft 532 toward the upper side.

The coupling body 534 may be fitted and coupled to the first opening 513 of the hinge bracket 510. A diameter of an upper end portion of the extension portion 534 may be larger than a diameter of the opening 512 of the hinge bracket 510.

The length of the coupling body 534 in the vertical direction may be greater than the thickness of the hinge bracket 510.

Since the first hinge pin 530 is fixed to the hinge bracket 510, the main door 30 can rotate around the fixed first hinge pin 530.

The hinge mechanism 50 may further include a first bushing 540 coupled to the first shaft 532. The first bushing 540 may be rotatably coupled to the first shaft 532. The first shaft 532 may be formed of a metallic material, and the first bushing 540 may be formed of a non-metallic material. Therefore, the first bushing 540 can smoothly rotate with respect to the first shaft 532 by the first bushing 540.

The first bushing 540 may be formed in a cylindrical shape and may accommodate the first shaft 532.

The hinge mechanism 50 may further include a fixing bracket 550. The fixing bracket 550 may be fixed to the main door 30. For example, the fixing bracket 550 may be coupled to the bottom 323 of the slot 322 of the main door 30.

The fixing bracket 550 may be disposed under the support bracket 510 in a state of being spaced apart from the support bracket 510. In a state in which the fixing bracket 550 is fixed to the main door 30, a portion 551 of the fixing bracket 550 may be accommodated in the guide accommodation portion 410 of the sub door 40.

The fixing bracket 550 may include a second opening 552. The second opening 552 may be formed to pass through the fixing bracket 550 in a vertical direction. The second opening 552 may be aligned with the first opening 513 of the hinge bracket 510 in the vertical direction. Accordingly, the rotation center C may pass through the first opening 513 and the second opening 552.

The hinge mechanism 50 may further include a second hinge pin 560. The second hinge pin 560 may enable rotation of the sub door 40 with respect to the main door 30. For example, the second hinge pin 560 may provide a rotation center C of the sub door 40. At this time, the rotation center C of the main door 30 provided by the first hinge pin 530 and the rotation center C of the sub door 40 provided by the second hinge pin 560 coincide with each other.

The second hinge pin 560 may include a second shaft 562. The second shaft 562 may be formed in a cylindrical shape, for example.

The second hinge pin 560 may further include a pin body 564 extending upward from the second shaft 562.

The pin body 564 may include an accommodation space for accommodating the first bushing 540. An inner circumferential surface of the pin body 564 forming the accommodation space may be in contact with an outer circumferential surface of the first bushing 540.

A length of the pin body 564 in the vertical direction may be longer than a length of the second shaft 562 in the vertical direction. Accordingly, the first bushing 540 may be accommodated in the pin body 564, and the first shaft 532 may be accommodated in the first bushing 540 within the pin body 564.

The first body 542 of the first bushing 540 may be fitted and coupled to the pin body 564. Therefore, the first bushing 540 can rotate with respect to the first shaft 532 in a state of being fixed to the pin body 564 during the rotation of the main door 30.

The pin body 564 may be fitted and coupled to the second opening 552.

In the present embodiment, since the first bushing 540 is disposed between the first hinge pin 530 and the second hinge pin 560, even when the first shaft 532 is located inside the second hinge pin 560, direct friction between the first shaft 532 and the second hinge pin 560 can be prevented.

In the present embodiment, since the first shaft 532 is accommodated in the second hinge pin 560, even if the rotation centers C of the main door 30 and the sub door 40 coincide with each other, an increase in the height of the hinge mechanism 50 can be minimized.

The hinge mechanism 50 may further include a second bushing 570 coupled to the second shaft 562. The second bushing 570 may be rotatably coupled to the second shaft 562. The second shaft 562 may be formed of a metallic material, and the second bushing 570 may be formed of a non-metallic material. The second bushing 570 can smoothly rotate with respect to the second shaft 562 during the rotation process of the sub door 40 by the second bushing 570.

The second bushing 570 may include a lower body 572 accommodating the second shaft 562 and an upper body 574 accommodating the pin body 564.

The inner diameter of the upper body 574 may be larger than that of the lower body 572. An outer diameter of the upper body 574 may be larger than that of the lower body 572.

The sub door 40 may include a hinge coupling portion 422 formed on the bottom surface of the guide accommodation portion 410 and having a recessed shape. The rotation center C may pass through the hinge coupling portion 422 in a vertical direction.

For example, the second bushing 570 may be coupled to the hinge coupling portion 422.

In a state in which the second bushing 570 is coupled to the hinge coupling portion 422, when the sub door 40 rotates, the hinge coupling portion 422 and the second bushing 570 together may rotate about the hinge pin 560.

The assembly process of the hinge mechanism 50 will be briefly described.

A second bushing 570 may be coupled to the hinge coupling portion 422 of the sub door 40.

The second hinge pin 560 may be coupled to the fixing bracket 550. In this state, when the fixing bracket 550 is fixed to the main door 30 and the second hinge pin 560 is inserted into the second bushing 570, the main door 30 and the sub door 40 may be connected.

The first bushing 540 may be coupled to the second hinge pin 560. The first hinge pin 530 may be coupled to the hinge bracket 510.

When the hinge bracket 510 is fixed to the cabinet 10 and the first hinge pin 530 is inserted into the first bushing 540, assembly of the hinge mechanism 50 may be completed.

The bracket cover 80 may surround at least a portion of the hinge bracket 510 to which the first hinge pin 560 is coupled.

In a state in which the bracket cover 80 covers the hinge bracket 510, the guide passage 827 of the bracket cover 80 is located in the guide accommodation portion 410 of the sub door 40. The guide passage 827 may be located above the hinge bracket 510 within the guide accommodation portion 410.

The guide passage 827 may be aligned with the first hinge pin 530 in the vertical direction. The guide passage 827 may be aligned with the second hinge pin 560 in the vertical direction. Accordingly, the rotation center C may pass through the guide passage 827.

The guide passage 827 and the first hinge pin 530 may be spaced apart in a vertical direction so that the wire W may be located between the guide passage 827 and the first hinge pin 530.

The wire guide 70 may be located above the bracket cover 80 in a state of being coupled to the main door 30.

An outlet 714 through which the wire W is drawn from the wire guide 70 may be aligned with the guide passage 827 in the vertical direction. Accordingly, the outlet 714 may be aligned with the first hinge pin 530 and the second hinge pin 560 in the vertical direction. Accordingly, the rotation center C may pass through the outlet 714.

Referring to the extension path of the wire W, the wire W may extend downward from the outlet 714 of the wire guide 70. The wire W passing through the outlet 714 may pass through the wire passage 827 in a downward direction. The wire W passed through the wire passage 827 may extend toward the cabinet 10 rearward within the bracket cover 80.

Accordingly, the wire W is guided to the sub door 40 in a state in which the wire is withdrawn from the main door 30 and may pass through the rotation center C in the sub door 40. The wire W passed through the sub door 40 extends toward the cabinet after penetrating the main door 30 by the bracket cover 80.

According to the present embodiment, when the main door 30 is opened, the sub door 40 may rotate together with the main door 30. The main door 30 may rotate based on the rotation center C. Since the rotation center C is located at the sub door 40 as described above, the distance between the front surface of the sub door 40 and the rotation center C is reduced, thereby the possibility of the sub door 40 colliding with surrounding structures can be reduced during the rotation of the main door 30.

When the main door 30 is closed, the sub door 40 may rotate about the rotation center C. Since the rotation center C of the sub door 40 is located on the sub door 40, the possibility of the sub door 40 colliding with surrounding structures during the rotation of the sub door 40 can be reduced.

When the refrigerator is accommodated in a furniture closet, if the overall thickness of the door 21 is reduced, the length of the door 21 protruding from the front surface of the furniture closet may be reduced.

In addition, according to the present embodiment, since the wire W passes through the rotation center C and extends toward the cabinet 10, during the rotation of the main door 30 or the sub door 40, the twisting of the wire W may be minimized.

In the present specification, since each of the wire guide and the bracket cover serves to guide the wire, the wire guide may be referred to as a first guide and the bracket cover may be referred to as a second guide.

In the present embodiment, the bracket cover may be omitted according to the shape change of the main door or the shape change of the wire guide. Even in this case, the wire may extend toward the cabinet after being guided toward the rotation center.

The invention claimed is:

1. A refrigerator comprising:

a cabinet having a storage space;

a hinge mechanism coupled to the cabinet;

a main door coupled to the hinge mechanism and configured to open and close the storage space;
a sub door coupled to the hinge mechanism to be relatively rotatable with respect to the main door, a rotation axis of the main door extending into the sub door; and
a wire guide that guides a wire electrically connected to a component of the main door, the wire guide having an inlet through which the wire is received from the main door and drawn into the wire guide, and an outlet through which the wire is drawn out of the wire guide,
wherein the hinge mechanism comprises a hinge pin configured to provide a rotation axis of the sub door,
wherein at least a portion of the outlet of the wire guide overlaps the sub door in a vertical direction,
wherein the wire passing through the outlet of the wire guide is extended toward the cabinet without passing through the hinge pin, and
wherein the rotation axis of the main door and the rotation axis of the sub door pass through the outlet of the wire guide.

2. The refrigerator of claim 1,
wherein the main door includes a guide coupling recess to which the wire guide is coupled,
wherein a portion of the wire guide protrudes forward of the main door, and
wherein the sub door includes a guide accommodation recess in which the portion of the wire guide is received.

3. The refrigerator of claim 2,
wherein an opening through which the wire passes from inside the main door is provided on one side wall of the guide coupling recess.

4. The refrigerator of claim 2,
wherein the outlet of the wire guide is located in the guide accommodation recess of the sub door.

5. The refrigerator of claim 2,
wherein the wire guide includes:
a guide body including the inlet and the outlet; and
a first extension wall and a second extension wall extending in a horizontal direction from an inlet side of the guide body and spaced apart from each other in a vertical direction,
wherein the first extension wall and the second extension wall are coupled to the guide coupling recess, and
wherein the guide body is located outside of the main door.

6. The refrigerator of claim 5,
wherein the first extension wall and the second extension wall are slidably coupled to the guide coupling recess,
wherein a coupling rib is provided on a side wall of the guide coupling recess, and
wherein the first extension wall includes a coupling slit accommodating the coupling rib.

7. The refrigerator of claim 5,
wherein a side wall of the guide coupling recess includes a fastening hole that receives a fastener, and
wherein the first extension wall includes a fastening boss to which the fastener penetrating through the fastening hole is fastened.

8. The refrigerator of claim 5,
wherein the hinge mechanism includes:
a hinge bracket fixed to the cabinet; and
a first hinge pin fixed to the hinge bracket and providing the rotation axis of the main door; and
wherein the guide body is located above the hinge pin, the outlet is provided on a lower wall of the guide body, and at least a portion of the inlet is positioned higher than the outlet.

9. The refrigerator of claim 8, further comprising:
a bracket cover configured to cover at least a portion of the hinge bracket and to guide a portion of the wire passing through the outlet of the wire guide toward the cabinet between the guide body and the hinge bracket.

10. The refrigerator of claim 9,
wherein the bracket cover includes a wire passage aligned with the outlet and the first hinge pin in the vertical direction.

11. The refrigerator of claim 2, further comprising:
a bracket cover configured to cover at least a portion of the hinge mechanism and to guide a portion of the wire passing through the outlet of the wire guide toward the cabinet.

12. The refrigerator of claim 11,
wherein the bracket cover is located below the wire guide and includes a wire passage vertically aligned with the outlet.

13. The refrigerator of claim 11,
wherein the hinge mechanism includes:
a hinge bracket coupled to the cabinet; and
a first hinge pin coupled the hinge bracket and providing the rotation axis of the main door; and
wherein the bracket cover is positioned over a portion of the hinge bracket to which the first hinge pin is coupled.

14. The refrigerator of claim 13, further comprising:
a cabinet cover coupled to an upper surface of the cabinet and configured to cover at least a portion of the hinge bracket;
wherein the bracket cover is coupled to the cabinet cover.

15. The refrigerator of claim 12,
wherein the wire passage is located in the guide accommodation recess of the sub door.

16. The refrigerator of claim 1,
wherein the rotation axis of the main door coincides with a rotation axis of the sub door.

17. A refrigerator comprising:
a cabinet having a storage space;
a main door rotatably connected by a hinge to the cabinet and configured to open and close the storage space;
a sub door rotatably connected by the hinge to be relatively rotatable with respect to the main door;
a wire guide coupled to the main door and configured to define a first passage that guides a wire electrically connected to a component of the main door toward the sub door; and
a bracket cover coupled to the hinge and configured to define a second passage that guides the wire from the wire guide and toward the cabinet,
wherein a rotation axis of the main door and a rotation axis of the sub door pass through an outlet of the wire guide and the second passage of the bracket cover.

18. The refrigerator of claim 17,
wherein the wire guide includes an inlet through which the wire is drawn into the first passage of wire guide and the outlet through which the wire is drawn out of the first passage of the wire guide, and
wherein the second passage of the bracket cover is aligned with the outlet in a vertical direction.

19. A refrigerator comprising:
a cabinet having a storage space;

a main door rotatably connected by a first hinge to the cabinet and configured to open and close the storage space;

a sub door rotatably connected by a second hinge to be relatively rotatable with respect to the main door;

a wire guide coupled to the main door and configured to define a first passage that guides a wire electrically connected to a component of the main door toward the sub door; and a bracket cover configured to define a second passage that guides the wire from the wire guide and toward the cabinet, wherein the wire electrically connected to the component of the main door is extended toward the cabinet by the wire guide and the bracket cover without passing through the second hinge, wherein a rotation axis of the main door and a rotation axis of the sub door pass through the first passage of the wire guide.

* * * * *